United States Patent
Tsai et al.

(10) Patent No.: US 6,557,762 B1
(45) Date of Patent: May 6, 2003

(54) METHOD FOR INCREASING DEPTH OF SCANNING FIELD OF A SCANNING DEVICE

(75) Inventors: Jenn-Tsair Tsai, Taipei (TW); Albert Lu, Hsinchu (TW)

(73) Assignee: Mustek Systems Inc. (TW)

( * ) Notice: Subject to any disclaimer, the term of this patent is extended or adjusted under 35 U.S.C. 154(b) by 248 days.

(21) Appl. No.: 09/588,023

(22) Filed: Jun. 6, 2000

(51) Int. Cl.[7] .................................................. G06K 7/10
(52) U.S. Cl. ............ 235/454; 235/462.11; 235/462.22; 235/462.24; 235/462.32
(58) Field of Search ..................... 235/462.01, 462.23, 235/462.22, 462.32; 359/210

(56) References Cited

U.S. PATENT DOCUMENTS

| | | | | |
|---|---|---|---|---|
| 5,484,994 A | * | 1/1996 | Roustaei ................ | 235/462.25 |
| 5,565,668 A | * | 10/1996 | Reddersen et al. .... | 235/462.02 |
| 5,581,068 A | * | 12/1996 | Shepard et al. ........ | 235/462.02 |
| 5,703,721 A | * | 12/1997 | Bietry et al. ............ | 359/646 |
| 5,811,828 A | * | 9/1998 | Laser .................... | 250/566 |
| 5,847,884 A | * | 12/1998 | Kamon et al. ........... | 359/806 |
| 5,945,670 A | * | 8/1999 | Rudeen ................. | 250/235 |
| 6,056,198 A | * | 5/2000 | Rudeen et al. ......... | 235/462.24 |

* cited by examiner

Primary Examiner—Michael G. Lee
Assistant Examiner—Ahshik Kim
(74) Attorney, Agent, or Firm—Lowe Hauptman Gilman & Berner, LLP

(57) ABSTRACT

Before assembling a scanning module, the type of the scanning module is predetermined. When the scanning module is predetermined, the shape of MTF-DF curve is therefore fixed. The scanning module includes a glass plate, lens and an image generating means. During the assembly, the image generating means and the glass plate are mounted. A correction document is placed on the glass plate. The position of the lens is adjusted in order to reflect a point at the lowest point of the tolerant range of the depth of scanning field in the MTF-DF curve. The position of the lens is then fixed. An increased depth of scanning field in a scanning device is thusly obtained.

9 Claims, 3 Drawing Sheets

METHOD FOR INCREASING DEPTH OF SCANNING FIELD OF A SCANNING DEVICE

BACKGROUND OF THE INVENTION

1. Field of the Invention

The present invention generally relates to a method for adjusting the depth of scanning field to an optimally increased range. Especially, the invention is a scanner assembling method which increases and adjusts the depth of scanning field to an optimal range, Thus, the scanner can obtain good quality of scanning images even if the original document is wrinkled.

2. Background Description

Nowadays, the scanning mechanism and technology have improved dramatically. The scanning device is generally integrated to our daily life. Users can capture the images from documents and transfer the images to electrical files. Thus, the electrical files can be sent to others. Usually, the scanning device will employ some optical elements and scanning technologies. The employed optical technologies and elements are needed to be adjusted for scanning documents to acquire scanning images via a precise scanning mechanism. The scanning device is able to record the scanning image by an image generating means. In view of the above, the initial adjustment and assembly of the optical technologies and elements, are very important to the whole scanning processes.

Referring to FIG. 2, the traditional adjustment and assembly of a scanning device are illustrated as follows: FIG. 2 shows the traditional adjustment and assembly of the scanning mechanism along with the chart of MTF (Modulation Transfer Function) and DF (Depth of Field) curve. The scanning mechanism 22 includes a glass plate 221, lens 222 and an image generating means 220. The correction document 24 is placed on the glass plate 221.

Further, FIG. 2 also shows the chart of MTF and the depth of field of scanning position. The value of MTF represents resolution of the scanning module of a scanning device. MTF is generated from a mathematical formula. Higher value of MTF means higher resolution. Lower MTF can be deemed as a lower resolution of the scanning module, and vice versa. Generally, the shape 200 of the MTF-DF curve varies from different characteristics of the scanning module 22. Different positions of lens 222 also change the shape 200 of the MTF-DF curve. Therefore in the actual practice, the value of MTF should be kept above a certain value when the scanning module 22 is assembled. The certain value is shown in FIG. 2, as legend 201. This value is generated by the acceptance of resolution by human eyes. If the value of MTF is maintained above legend 201, the value of DF will range between the legend 204 and legend 205. Thus, the range between legend 204 and legend 205 is defined the tolerance of DF, and be presented by legend 202.

As stated in the above, when the scanning device is under adjusting process, a correction document 24 is placed on the glass plate 221. There are drawings and lines in the correction document for adjusting the scanning image. The scanning device also includes a light source (not shown in the figure). The light source projects light to the glass plate 221 and the light is reflected by the correction document 24. Thus, the reflected light, passes through an optical path 223 and lens 222 and finally been generated to a scanning image in a scanning generating means 222. The scanning generating means 222 is a CCD (charged coupled device). By an output device (not shown in the figures), the correction technician will: know the value of the MTF. This value of MTF represents the resolution of the correction document 24 which is placed on the glass plate 221. If the correction person adjusts the position of lens 222, the shape 200 of MTF-DF will move upward or downward, following the changing position of lens 222. In this way, the related MTF of the scanning module 22 will be achieved. Therefore, the correction person can adjust and fix the lens 222 to achieve the maximum value of MTF of the scanning module. The fixed position of the lens 222 is the best position to achieve the optimal resolution. This fixed position is also the optimal depth of field which is the legend 203.

Recently, users ask higher quality and more functions to the scanning device. For example, scanning devices with increased optical resolution and ability to scan different scanning objects are preferred by the buyers. However, if the manufacturer would increase the optical resolution, the resolution of the image generating means (e.g., CCD) and lenses should be improved together. If the resolution of the lens is increased, the optical depth of field will be decreased and range of the depth of field 202 will be smaller. Therefore, if the scanning document is wrinkled, the wrinkled document will easily be out of the range of the depth of field 202. Thus, the scanning image will be fizzy in this situation as illustrated in FIG. 1A. As shown in FIG. 1A, a scanning object 12 is placed on a glass plate 10. Because the scanning object 12 is not smooth, the portion 14 will easily be out of the range of the tolerant depth of field of the scanning device. Thus, the portion 14 is fuzzy. Moreover, if the scanning device is employed to scan books or magazines the same fuzzy effects will happen in the binder portion. As shown in FIG. 1B, when the book 16 is opened above the glass plate 10, the binder 18 of the book 16 will be above the glass plate at a certain height. The binder will possibly be out of the depth of field and cause the scanning image to be fuzzy and unreadable.

SUMMARY OF THE INVENTION

It is therefore an object of the present invention to provide a method of correction and assembly of a scanning device.

According to the present invention after a correction adjustment of the scanning module, a glass plate of a scanning module is placed at a lowest tolerant point of MTF-DF curve in order to improve the range of the optical depth of field of the scanning device. Therefore, users can employ the maximum tolerant range of DF to scan a wrinkled document or the book as shown in FIGS. 1A and 1B.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention generally fixes the glass plate at the minimum tolerant point of the MTF-DF curve. In this case, the whole tolerant range of the depth of scanning field can be employed to increase the tolerant range of the optical depth of scanning field of the scanning module.

Figure 1A:
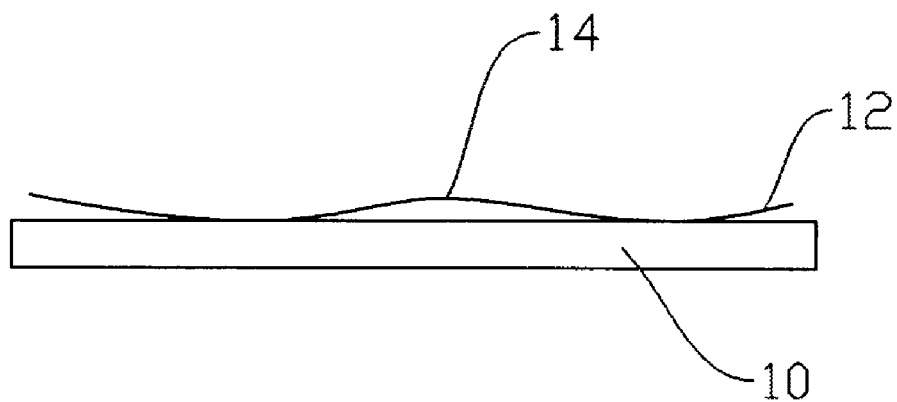
FIG. 1A is a general scheme of scanning a wrinkled document.
Figure 1B:
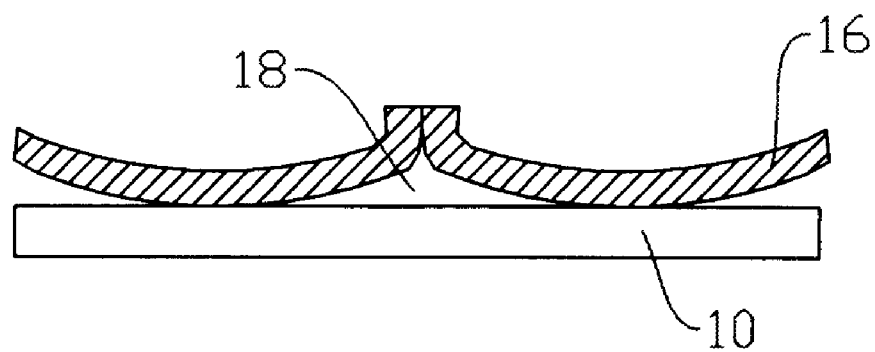
FIG. 1B is a schematic demonstration of scanning an opened book.
Figure 2:
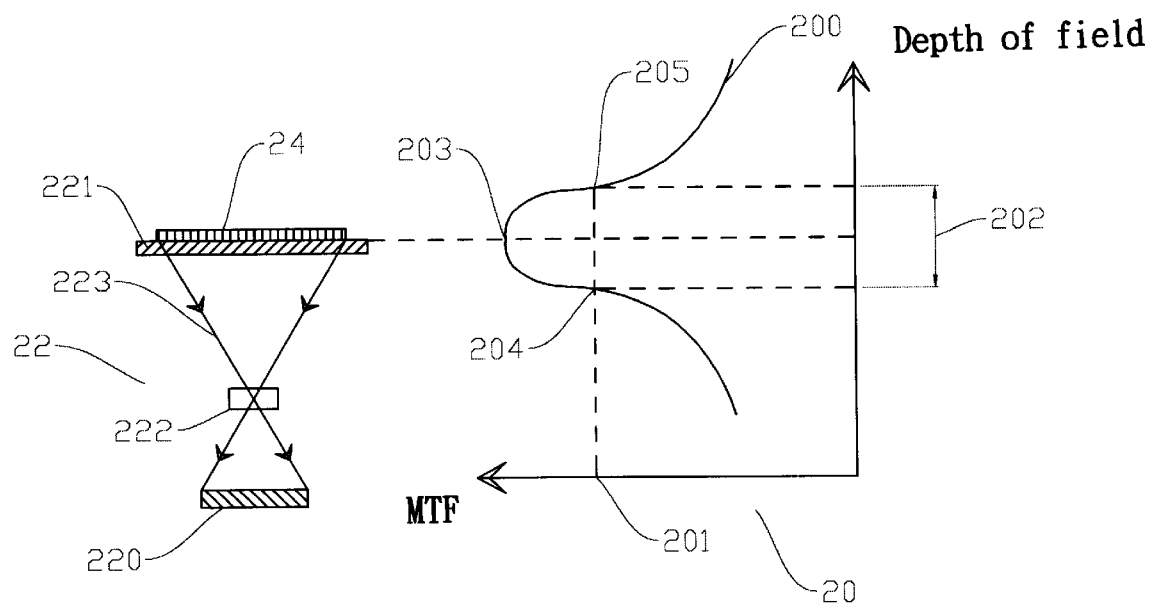
FIG. 2 shows the correction adjustment of a scanning module and the related shape of MTF-DF curve.
Figure 3:
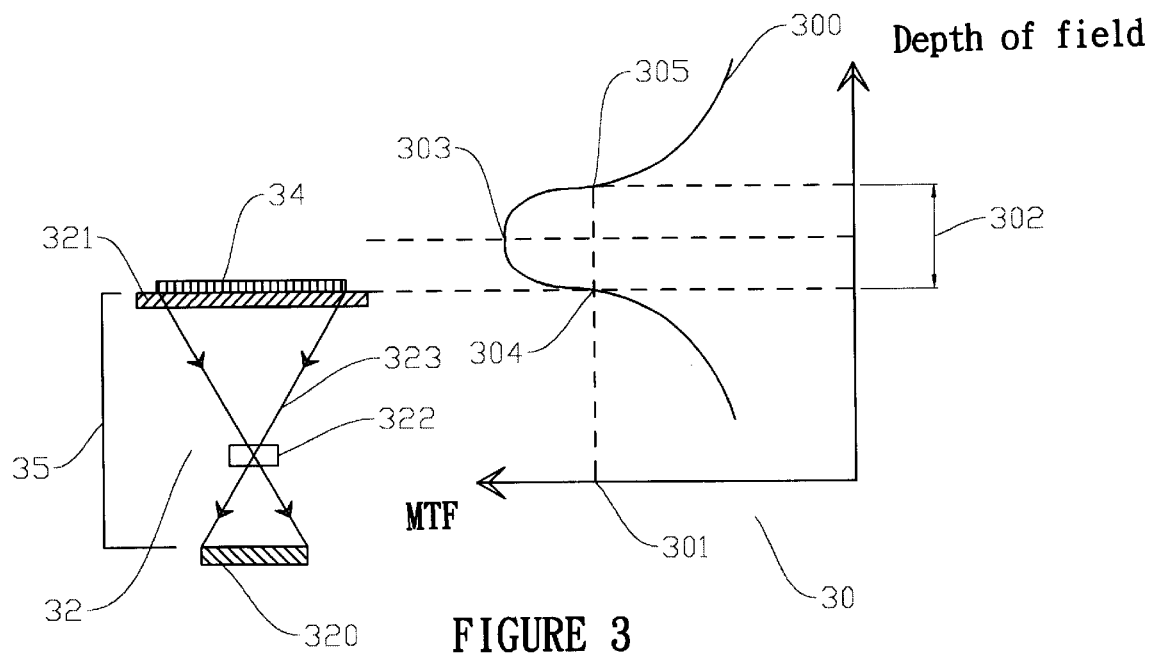
FIG. 3 shows the first embodiment of the correction adjustment of the scanning module and the related shape of MTF-DF curve.

First, please refer to FIG. 3. FIG. 3 shows the first embodiment of the correction adjustment pf the scanning module and the related shape of MTF-DF curve in accordance with the present invention. First the scanning module 32 of a scanning device (not shown in the figure) is selected. When the scanning module 32 is selected, the shape of MTF-DF curve 300 is fixed. Thus, the parameters of the tolerant range 203 of DF, the optimal point 303 of DF, the lowest tolerant point 304 of DF and the highest tolerant point 305 of DF are all fixed. After that, the tolerant value 301 of MTF must be determined. The tolerant value of MTF represents the minimum tolerance to the resolution of the scanning module 32, for ensuring the quality of the scanning module 32 being acceptable to the general users.

The scanning module 32 at least includes a glass plate 321, lens 322 and an image generating means 320. The image generating means 320 is first fixed on a predetermined position. The glass plate 321 is paced at a distance 35 from the image generating means 320. The distance 35 is a calculated distance by the designer originally. The lens 322 can move forward or backward between the glass plate 321 and the image generating means 320. After the processes of placing of the key elements, the adjustment continues. A correction document 34 is placed on the glass plate 321. There are drawings and lines printed on the correction document 34 for an adjustment purpose. The scanning device further comprises a light source (not shown in the Figure). The light source projects light to the glass plate 321. The light is reflected by the correction document 34 and therefore passing through an optical path 323 and lens 322. The reflected light generates an image in the image generating means 320. The adjustment technician therefore is able to acquire the value of MTF by an output device to analyze the passing image. The MTF value is able to present the resolution of the correction document which is placed on the glass plate 321 before. If the correction technician adjusts the position of the lens 322 back and forth, the MTF-DF curve 300 will move upward and downward at the same time. When the position of glass plate 321 reflects the lowest tolerant point 304 of the depth of the scanning field, the value of MTF is the tolerant value of MTF at point 301. Thus, the correction technician fixes the lens 322. Therefore, the available range for scanning documents is increased because the depth of scanning field is increased to accept a wrinkled document. Alternatively, the range of the depth of scanning field will also be increased if the glass plate 321 is mounted between the optimal point 303 and the point 304. Although the depth of scanning field is increased, the quality of the scanning image is still acceptable since the point 304 is under the tolerant range of MTF value. On the other hand, if the position of the glass plate 321 reflects the point 304 of the depth of scanning field, the range of the depth of scanning field is optimized.

Figure 4:
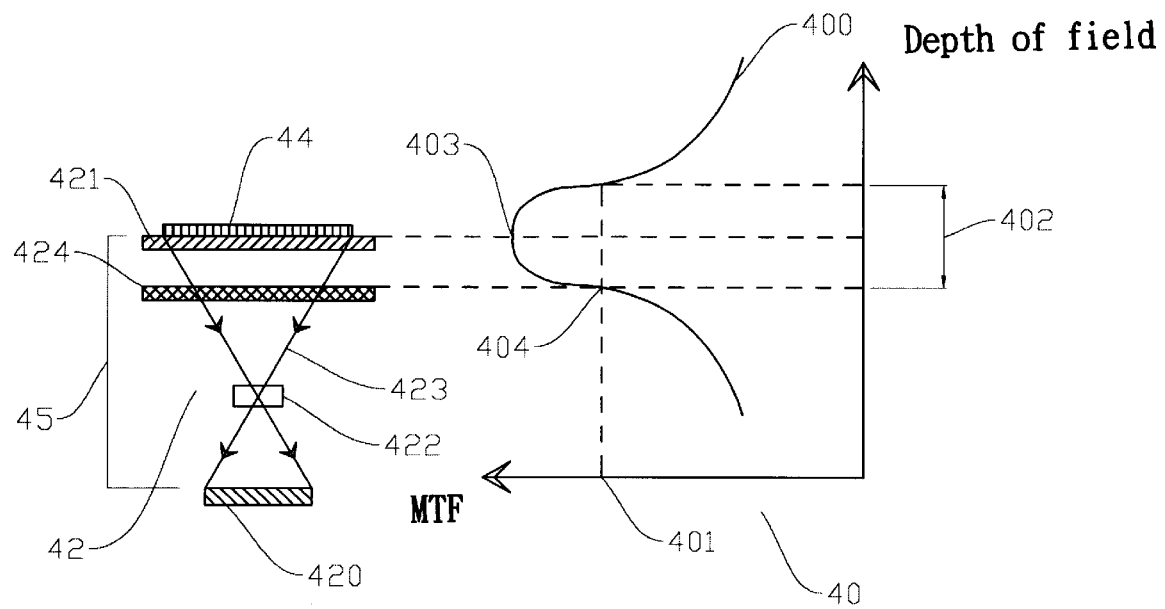
FIG. 4 shows the second embodiment of the correction adjustment of the scanning module and the related shape of MTF-DF curve.
Figure 5:
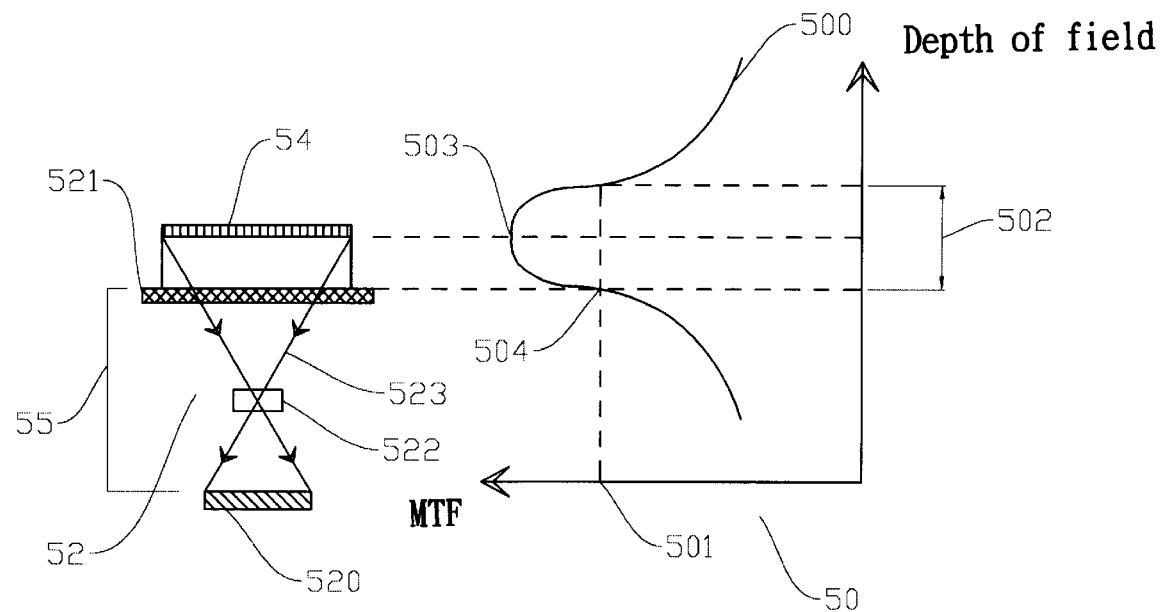
FIG. 5 shows the third embodiment of the correction adjustment of the scanning module and the related shape of MTF-DF curve.

Referring to FIG. 4, the second embodiment in accordance with the present invention is shown. FIG. 4 is the second embodiment of the correction adjustment of the scanning module and the related shape of MTF-DF curve. For the convenience in comparing the first and the second embodiment, the preparation and the assembly of the second embodiment are the same as the first embodiment. The difference of the first and the second embodiment is the fixation procedure. Particularly, the glass plate 421 is temporarily set in front of the image generating means 420 at a distance 45 after the image generating means 420 is mounted at a predetermined position. Is this case, the lens 422 is therefore placed between the glass plate 421 and the image generating means 420. In the process of correction, a correction document 44 is placed on the glass plate 421. The light source (not shown in the Figure) of the scanning device provides light propagating to the glass plate 421 then being reflected by the correction document 44. The reflected light is advanced to an optical path 423 and transmitting through the lens 422. Thus, the image of the correction document 44 will be generated in the image generating means 420. The correction and adjustment person checks the value of MTF of the generated image by an output device (not shown in the Figure). At this time, the correcting and adjustment technician can adjust the position of the lens 422 in order to fine tune the MTF value. In this case, the correction person can find the maximum value of the MTF. The lens 422 is therefore fixed qt the point of the maximum value of the MTF. Now the glass plate 421 is placed at the optimal point 403. Then the temporary placement of the glass plate 421 will be adjusted again. The document glass 421 is lowered half of the tolerant range 402. This lowered position of the glass plate 421 is the fixed position 424 during the manufacturing process. Because the fixed position 424 of the glass plate 421 reflects the minimal point 404 of the tolerant range 402 of DF, the increased depth of scanning field is the same as the first embodiment. On the other hand, the range of the depth of scanning field will also be increased if the fixed position 424 of the glass plate 421 is mounted between the optimal point 403 and the lowest tolerant point 404. Although the depth of scanning field is increased, the quality of the scanning image is still acceptable since the point 404 is under the tolerant range of MTF value. Alternatively, if the position of the glass plate 421 reflects the point 404 of the depth of scanning field, the range of the depth of scanning field is optimized:

In FIG. 5, there is shown the third embodiment in accordance with the present invention. FIG. 5 shows the adjustment of the scanning module and the related MTF-DF curve. In the third embodiment, the preparation is the same as the first embodiment. This means the image generating means 520 is fixed at a predetermined position. Then the glass plate 521 is placed at a distance 55 from the image generating means 520. The lens 522 can be mounted between the glass plate 521 and the image generating means 520. In the correction and adjustment procedure, the adjustment technicians have to place a correction document 54 above the glass plate 521 at a certain distance. Especially, the correction document 54 is placed on the point of half of the tolerant range of the depth of the scanning field above the glass plate 521. In the case, the light source of the scanning device (not shown in the FIG. 5) projects light to the glass plate 521. After the reflection of the correction document 54, the light passes the optical path 523 and goes through the lens 522. The reflected light is therefore generated to an image by the image generating means 520. The adjustment technician can obtain an MTF value by detecting the generated image from an output device (not shown in the FIG. 5). At this time, the adjustment technician may move the lens 522 to find the maximum value of MTF. The lens 522 is mounted at the point which MTF parameter achieves the maximum value. In this case, the correction document 54 can be removed and the glass plate 521 is at the lowest tolerant point 504 of the related MTF-DF curve 500. Therefore, the third embodiment can achieve the same effects of the first embodiment. The available scanning range of the scanning module 52 is increased. The scanning device obtains larger depth of optical scanning field.

In view of the above, if the correction document 54 is set at a predetermined distance from the glass plate 521 and the predetermined distance is not longer than half of the tolerant range of the DF 502, the position of the glass plate 521 presents a point between the optimal point 503 and the lowest tolerant point 504 in the MTF-DF curve 500. In this case, the depth of the scanning field is also increased. However, the third embodiment will optimally increase the range of the depth of scanning field.

Although preferred embodiments of the present invention have been described in the foregoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A method for increasing depth of scanning field of a scanning device, said scanning device comprising a scanning module comprising an image generating means, lens and a glass plate, the steps of said method comprising:

arranging said scanning module to fix the shape of an MTF-DF curve, and determining a tolerant value of MTF, an optimal point of the depth of field, a lowest point and a highest point of a tolerant range of the depth of field;

fixing said image generating means at a predetermined position;

fixing said glass plate at a distance away from said image generating means and placing a correction document on said glass plate;

adjusting the position of said lens in order to form the image of said correction document on said image generating means, further permanently fixing the position of said lens at a point which is between said optimal point of the depth of field and said lowest point of the tolerant range of the depth of field;

removing said correction document; and finishing the assembly of said scanning device.

2. The method of claim 1, wherein said image generating means is a charge coupled device.

3. The method of claim 1, wherein said step of fixing the position of said lens comprises fixing said glass plate at an optimal position at the point of the lowest point of the tolerant range of the depth of field.

4. A method for increasing depth of scanning field of a scanning device, said scanning device comprising a scanning module comprising an image generating means, lens and a glass plate, the steps of said method comprising:

arranging said scanning module to fix the shape of an MTF-DF curve, and determining a tolerant value of MTF, an optimal point of the depth of field, a lowest point and a highest point of a tolerant range of the depth of field;

fixing said image generating means at a predetermined position;

temporarily placing said glass plate at a distance away from said image generating means and placing a correction document on said glass plate, adjusting the position of said lens in order to form the image of said correction document on said image generating means, further obtaining a relative maximum value of the MTF curve, permanently fixing the position of said lens at the position representing the relative maximum value of the MTF;

permanently fixing said glass plate at a position between said optimal point of the depth of field and said lowest point of the tolerant range of the depth of field;

removing said correction document; and finishing the assembly of said scanning device.

5. The method of claim 4, wherein said image generating means is a charge coupled device.

6. The method of claim 4, wherein said step of fixing the position of said lens comprises the step of fixing said glass plate at an optimal position at the point of the lowest point of the tolerant range of the depth of field.

7. A method for increasing depth of scanning field of a scanning device, said scanning device comprising a scanning module comprising an image generating means, lens and a glass plate, the steps of said method comprising:

arranging said scanning module to fix the shape of MTF-DF curve, and determining a tolerant value of MTF, an optimal point of the depth of field, a point of lowest point and a highest point of a tolerant range of the depth of field;

fixing said image generating means at a predetermined position;

fixing said glass plate at a distance away from said image generating means and placing a correction document above said glass plate at a first predetermined distance;

adjusting the position of said lens in order to form the image of said correction document on said image generating means, further obtaining a relative maximum value of the MTF, permanently fixing the position of said lens when said glass plate is fixed at said predetermined distance below said optimal point of said depth of field;

permanently fixing said glass plate at a position between said optimal point of the depth of field and said lowest point of the tolerant range of the depth of field;

removing said correction document; and finishing the assembly of said scanning device.

8. The method of claim 7, wherein said image generating means is a charge coupled device.

9. The method of claim 7, wherein the step of fixing the position of said lens comprises fixing said glass plate at an optimal position at the point of the lowest point of the tolerant range of the depth of field.

* * * * *